(12) United States Patent
Tsuji et al.

(10) Patent No.: US 8,337,722 B2
(45) Date of Patent: Dec. 25, 2012

(54) METHOD FOR PRODUCING ZINC SULFIDE BASED PHOSPHOR

(75) Inventors: Yoshihisa Tsuji, Kurashiki (JP); Kazuma Inoue, Kurashiki (JP); Jun Takai, Kurashiki (JP); Hideharu Iwasaki, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/057,168

(22) PCT Filed: Jul. 30, 2009

(86) PCT No.: PCT/JP2009/063548
§ 371 (c)(1),
(2), (4) Date: Feb. 2, 2011

(87) PCT Pub. No.: WO2010/016419
PCT Pub. Date: Feb. 11, 2010

(65) Prior Publication Data
US 2011/0147663 A1 Jun. 23, 2011

(30) Foreign Application Priority Data
Aug. 6, 2008 (JP) ................. 2008-203211

(51) Int. Cl.
*C09K 11/54* (2006.01)
*C09K 11/56* (2006.01)
*C01G 9/08* (2006.01)

(52) U.S. Cl. ............... 252/301.6 S; 423/566.1
(58) Field of Classification Search .............. None
See application file for complete search history.

(56) References Cited

U.S. PATENT DOCUMENTS

| | | | |
|---|---|---|---|
| 3,775,173 A * | 11/1973 | Yamamoto et al. | 427/157 |
| 3,957,678 A * | 5/1976 | Dikhoff et al. | 252/301.6 S |
| 5,032,374 A * | 7/1991 | Pastor et al. | 423/561.1 |
| 6,387,299 B1 * | 5/2002 | Vaddi et al. | 252/301.6 P |
| 6,682,664 B1 * | 1/2004 | Chen et al. | 252/301.6 S |
| 2006/0230980 A1 | 10/2006 | Kappe et al. | |
| 2007/0069180 A1 * | 3/2007 | Ju et al. | 252/301.4 R |

FOREIGN PATENT DOCUMENTS

| | | |
|---|---|---|
| EP | 1 710 290 A2 | 10/2006 |
| EP | 2 011 847 A1 | 1/2009 |
| JP | 2004 99881 | 4/2004 |
| JP | 2005 264108 | 9/2005 |
| JP | 2005-281380 | 10/2005 |
| JP | 2007 106832 | 4/2007 |

OTHER PUBLICATIONS

International Search Report issued Aug. 25, 2009 in PCT/JP09/063548 filed Jul. 30, 2009.

Extended European Search Report issued Aug. 4, 2011, in Patent Application No. 09804903.4.

Sang-Do Han, et al., "Crystal growth of electroluminescent ZnS:Cu,Cl phosphor and its $TiO_2$ coating by sol-gel method for thick-film EL device", Journal of Luminescence, vol. 115, No. 3-4, XP 005070688, Nov. 1, 2005, pp. 97-103.

* cited by examiner

*Primary Examiner* — Carol M Koslow
*Assistant Examiner* — Sarah A Slifka
(74) *Attorney, Agent, or Firm* — Oblon, Spivak, McClelland, Maier & Neustadt, L.L.P.

(57) ABSTRACT

The present invention provides a method for producing a zinc sulfide based phosphor by firing a zinc sulfide based precursor, comprising at least: a first firing step and a second firing step. Use of the method of the present invention makes it possible to provide a zinc sulfide based phosphor material suitable in the production of an EL device that shows high brightness.

10 Claims, 7 Drawing Sheets

METHOD FOR PRODUCING ZINC SULFIDE BASED PHOSPHOR

TECHNICAL FIELD

The present invention relates to methods for producing a zinc sulfide based phosphor.

BACKGROUND ART

Inorganic materials mainly composed of a compound semiconductor having fluorescence emission properties have been used as a light-emitting material and a photo-storage material. In recent years, light-emitting materials having electroluminescence (EL) properties and being capable of emitting light with electric energy are expected as a novel material for light emitting elements used in light sources or display apparatuses and have attracted attention. However, most of currently available inorganic EL materials are inadequate in efficiency of converting electric energy into light, and have a problem of heat generation and also problems with power consumption, EL brightness and the like. Thus, research and development have been conducted in search of a more practical inorganic EL material.

For example, in connection with development of blue EL materials, research has been conducted on methods for producing a phosphor comprising zinc sulfide as a host.

It is known as one approach for producing a zinc sulfide based phosphor to thermally dope a luminescent center into a zinc sulfide host (refer to, for example, Patent Document 1). Another known approach for producing a zinc sulfide based phosphor comprises doping a zinc sulfide with a luminescent center while the zinc sulfide is chemically produced. In the latter approach, a metal salt containing a metal element that acts as a luminescent center may be combined with a zinc salt before producing zinc sulfide under hydrothermal conditions (refer to, for example, Patent Document 2), or alternatively, an aqueous solution of a sulfurizing agent may be added to react with a liquid solution containing a zinc salt and metal salts, wherein said metal salts comprise a metal element that acts as a luminescent center (refer to, for example, Patent Document 3). Patent Documents 2 and 3 describe that a phosphor precursor thus obtained is heated and fired to cause immobilization of luminescent center and crystallization, which provide in conversion of the phosphor precursor into a phosphor.

CITATION LIST

Patent Document

Patent Document 1: Japanese unexamined patent publication No. 2004-99881
Patent Document 2: Japanese unexamined patent publication No. 2005-264108
Patent Document 3: Japanese patent application No. 2005-297707

SUMMARY OF INVENTION

Technical Problem

However, each of the above production methods has a problem to be solved toward practical use.

For example, the approach of thermally doping a luminescent center into zinc sulfide has a problem that obviously uneven distribution of the metal dopants in and between particles is caused by nonuniformity in particle size of raw materials, a manner of mixing zinc sulfide with a metal salt that provided as a source of the metal dopant, and a mixed state of the resulting mixture, so that color of emission is not uniform in each particle and between particles.

The approach of producing zinc sulfide under hydrothermal conditions has a problem that facilities used for the reaction are corroded significantly by hydrogen sulfide evolved, and this corrosion is a significant hindrance in scaling up for industrial application.

Furthermore, the approach of doping zinc sulfide with a metal dopant to form a luminescent center by using a liquid-phase reaction has a problem that the reaction of a zinc compound and salts of the doping metals with a sulfurizing agent does not result in uniform distribution of the metal dopants in particles, since the metal salts that are provided as a source of metal dopants have different reaction rates. To avoid this problem, the reaction may be carried out by heating to reduce a difference in an apparent reaction rate. However, this solution is not preferred, because the same problem as that of the approach of thermal metal doping arises.

Some of the above patent documents describe that oxygen may be introduced at a time of firing a phosphor precursor. However, the introduced oxygen causes conversion of zinc sulfide to zinc oxide, and therefore addition of excessive oxygen is not preferred. Another problem is that there is a temperature at which crystalline motions may bring diffusion of oxygen within particles to cause oxidation to proceed and, thus, the degree of crystallization does not sufficiently increase to produce a practical high brightness phosphor.

Accordingly, an object of the present invention is to provide a method for producing a zinc sulfide based phosphor having high brightness in an industrially advantageous manner.

Solution to Problem

The inventors of the present application focused on the fact that the brightness of an phosphor was significantly affected by treatment conditions in respective steps comprising from preparation to firing of a zinc sulfide based phosphor precursor, and conducted detailed studies on each of the steps. As a result, they found that the above object could be achieved by the present invention. Specifically, the present invention provides:

[1] A method for producing a zinc sulfide based phosphor by firing a zinc sulfide based phosphor precursor, comprising at least:

a first firing step of firing a mixture containing a zinc sulfide based phosphor precursor, sulfur, and a chlorine-containing flux; and a second firing step of further firing the fired product obtained from the first firing step, wherein the first firing step comprises: heating the mixture in an atmosphere into which oxygen is introduced, so that a temperature of the mixture is increased from normal temperature to a transformation temperature at which a crystal system of the phosphor precursor is transformed; when a temperature of the mixture is increased above the transformation temperature, switching the atmosphere to a nitrogen atmosphere and continuing the heating of the mixture; and when the temperature of the mixture reaches a temperature in a range of 1000° C. to 1200° C., inclusive, maintaining the temperature of the mixture at a constant level and thereafter rapidly quenching the mixture and washing the mixture to obtain a fired product; and wherein the second firing step comprises heating in the nitrogen atmosphere the fired product obtained from the first firing step so that a temperature of the fired product is increased from normal temperature to a temperature in a range of 650° C. to 1000° C., inclusive; and when a temperature of the fired product reaches the temperature in the range of 650° C. to 1000° C., inclusive, introducing oxygen while maintaining the temperature of the fired product and thereafter rapidly quenching the fired product and washing the fired product to obtain a zinc sulfide based phosphor;

[2] The method of [1], wherein in the first firing step, the atmosphere is switched to the nitrogen atmosphere at a temperature of 850° C. or lower;

[3] The method of [1] or [2], wherein distortion is created in a crystal of the fired product after the washing in the first firing step and before the second firing step;

[4] The method of [3], wherein the washing and the creation of the distortion are carried out simultaneously;

[5] The method of any one of [1] to [4], wherein a compound containing copper, zinc, and sulfur is added to the fired product obtained from the first firing step, prior to the second firing step;

[6] The method of any one of [1] to [5], wherein the phosphor precursor is a zinc sulfide based phosphor precursor obtained by adding to an organic solvent an aqueous solution containing a zinc compound, a sulfurizing agent, and one or more metal compounds containing at least one metal element selected from the group consisting of copper, silver, gold, manganese, iridium, and rare-earth elements, and thereafter heating a resulting mixture to carry out azeotropic dehydration;

[7] The method of any one of [1] to [5], wherein the phosphor precursor is a zinc sulfide based phosphor precursor obtained as a reaction product obtained by adding a sulfurizing agent to an aqueous solution containing a zinc compound and one or more metal compounds containing at least one metal element selected from the group consisting of copper, silver, gold, manganese, iridium, and rare-earth elements, and allowing the sulfurizing agent to react with the aqueous solution;

[8] The method of [6] or [7], wherein the sulfurizing agent is thioacetamide and/or hydrogen sulfide;

[9] The method of any one of [1] to [5], wherein the phosphor precursor is a mixture containing zinc sulfide and one or more metal compounds containing at least one metal element selected from the group consisting of copper, silver, gold, manganese, iridium, and rare-earth elements;

[10] The method of any one of [1] to [9], wherein the introduction of oxygen is carried out by allowing an oxygen-containing gas stream to flow into an atmosphere around the phosphor precursor; and

[11] The method of [10], wherein the oxygen-containing gas stream is an air stream.

Advantageous Effects of Invention

By the method for producing a zinc sulfide based phosphor according to the present invention, a highly practical phosphor with high EL brightness can be produced in an industrially advantageous manner.

DESCRIPTION OF EMBODIMENTS

Figure 1:
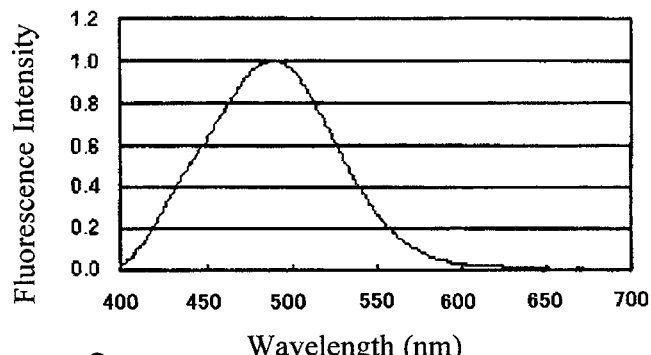
FIG. 1 shows a fluorescence spectrum (emission peak wavelength: 486 nm) of a phosphor obtained in Comparative Example 1.

In the present invention, a zinc sulfide based phosphor precursor is fired to produce a phosphor. The phosphor precursor is not particularly limited, and any phosphor precursor comprising zinc sulfide as a host component of the phosphor may be used. The phosphor precursor refers to a substance that is preliminarily prepared to be converted into a phosphor, and shows no fluorescence upon excitation by absorption of light or shows fluorescence at a level that is not considered sufficient from a practical point of view, and is required to be subjected to a further treatment step (e.g., firing step) to obtain desired fluorescence properties. Hereinafter, the phosphor precursor is sometimes referred to simply as a precursor.

In the present invention, the phosphor is produced through steps including at least first and second firing steps. In the first firing step, the degree of crystallization of a zinc sulfide based phosphor precursor is increased to provide conversion of the crystal system into a hexagonal system. First, appropriate amounts of sulfur and a chlorine-containing flux are added to the precursor in the first firing step.

Examples of chlorine-containing fluxes include alkali metal chlorides such as lithium chloride, sodium chloride, potassium chloride, and cesium chloride, alkali earth metal chlorides such as calcium chloride, magnesium chloride, barium chloride, and strontium chloride, ammonium chloride, and zinc chloride. In view of persistence properties and melting temperature of a flux, it is preferable to mix a plurality of chlorides. Preferably, a mixture of potassium chloride, sodium chloride, and magnesium chloride may be used. An amount of the chlorine-containing flux used is not particularly limited. Typically, the chlorine-containing flux is used at a concentration in zinc sulfide of 0.1 to 80% by weight or, in view of an effect such as uniform dispersion of the flux, 0.5 to 60% by weight, more preferably 1 to 40% by weight.

A method for the addition of the chlorine-containing flux is not particularly limited. The chlorine-containing flux may be combined with zinc sulfide by solid-solid mixing prior to use, or alternatively it may be formed into a mixture prior to use by dissolving the chlorine-containing flux in water, mixing it with zinc sulfide, and then drying. In view of chemical stability of a flux to be used, solid-solid mixing and mixing in an aqueous solution may be used in combination.

An amount of sulfur added is not particularly limited. Sulfur may be added in any amount that is sufficient to inhibit oxidation of zinc sulfide by water or oxygen that adheres to a reactor or zinc sulfide during the firing step. Thus, typically, sulfur is added in an amount that corresponds to 0.01- to 2-fold, and more preferably 0.02- to 1-fold the weight of zinc sulfide.

In the present invention, it is important that the precursor is combined with sulfur and the chlorine-containing flux and heated in an atmosphere into which oxygen is introduced, so that the temperature of the mixture is increased from normal temperature to a temperature at which transformation of the crystal system of the precursor is initiated. As used herein, the term "normal temperature" refers to a temperature that is obtained without heating or cooling, and substantially corresponds to an average atmospheric temperature (or ambient temperature). Accordingly, an example of the normal temperature, although it may vary depending on a technical field or region, includes, but not to be limited to, a temperature in the range of about 5° C. to about 35° C. The heating of the precursor can be carried out by using a firing furnace that is commonly used in the art for firing of an inorganic material. With regard to the firing furnace, the amount of moisture adsorbed by a furnace material can be reduced to an appropriate level by maintaining the temperature in the furnace at about 30° C. prior to the introduction of the precursor. Thus, the temperature in the furnace at the time when the firing of the precursor is initiated is preferably about 30° C. or higher. When oxygen is introduced into the firing furnace at a temperature in the range higher than a temperature at which the crystal system of zinc sulfide is transformed, internal portions of the crystal particles are oxidized, resulting in decrease in phosphorescence performance of a final phosphor product. In the case of zinc sulfide, initiation of transformation of the crystal system can be observed at 800° C. or higher; a transformation of the crystal system can be more clearly observed at 850° C. or higher. Thus, in the present invention, after the start of the heating, oxygen is preferably introduced until the temperature reaches 850° C. or lower. Preferably, the introduction of oxygen is carried out by allowing an oxygen-containing gas stream to continuously flow into an interior part of the firing furnace (especially into an atmosphere around the phosphor precursor). A concentration of the inflowing oxygen is not particularly limited, but is preferably 1 to 30% by volume of the inflowing gas. From a viewpoint of economical efficiency, it is preferable to use an air stream (e.g., air derived from the atmosphere) in the introduction of the oxygen-containing gas stream. The transformation of the crystal system of the phosphor precursor can be observed by analysis of a diffraction pattern obtained by an X-ray powder diffraction method and an intensity of a diffraction peak from the (1, 0, 0) plane. The transformation of the crystal system starts at about 800° C., and results in complete conversion of a cubic system into a hexagonal system at 1020° C.

In the first firing step, after the temperature is increased above the temperature at which the transformation of the crystal system is initiated, the heating is carried out in a nitrogen atmosphere. Preferably, the atmosphere is replaced with the nitrogen atmosphere by switching the inflowing oxygen-containing gas to a nitrogen stream. After the temperature is increased up to at least 1000° C. and no more than 1200° C., this temperature is maintained. A period of time for which the temperature is maintained is preferably about 1 to about 5 hours. Thereafter, rapid quenching is carried out. The rapid quenching refers to cooling that is carried out such that the temperature is decreased at a rate greater than that in natural cooling. A cooling rate for the rapid quenching is not particularly limited, but it is preferable to cool as rapidly as possible. Preferably, the rapid quenching is carried out at a cooling rate in the range of 10° C. to 500° C. per minute or, in view of heat-shock properties of a crucible, in the range of 12° C. to 300° C. per minute.

The fired product thus cooled is washed with an acidic aqueous solution. Examples of acidic aqueous solutions that can be used include an aqueous solution of an organic acid such as formic acid or acetic acid, and an aqueous solution of a mineral acid such as hydrochloric acid, sulfuric acid, or phosphoric acid. In view of osmotic properties with respect to zinc sulfide and surface persistence properties, acetic acid or hydrochloric acid may be preferably used. After being washed with an acidic aqueous solution, the fired product is washed with ion exchanged water until the washing liquid becomes neutral.

The fired product obtained from the first firing step is then subjected to the second firing step. In the second firing step, the fired product is heated in a nitrogen atmosphere for, normally, 2 to 5 hours until it reaches a temperature of 650° C. to 1000° C., inclusive. Then, immediately after the fired product reaches a predetermined temperature, oxygen is introduced, and the predetermined temperature is maintained for a predetermined period of time. At this time, preferably, the oxygen is continuously introduced as an oxygen-containing gas stream into the firing furnace (especially into an atmosphere around the phosphor precursor). A period of time for the introduction of oxygen is not particularly limited but typically is in the range of 30 minutes to 2 hours. A concentration of introduced oxygen is not particularly limited, but is preferably 1 to 30% by volume of the inflowing gas. In view of economical efficiency, air may be preferably used for the introduction of oxygen. Thereafter, the oxygen-introduced atmosphere is preferably replaced again with the nitrogen atmosphere and the temperature is maintained for an additional predetermined period of time.

Thereafter, the fired product is rapidly quenched. A cooling rate for the rapid quenching is not particularly limited, but it is preferable to cool as rapidly as possible. Preferably, the rapid quenching is carried out at a cooling rate in the range of 10° C. to 500° C. per minute or, in view of heat-shock properties of a crucible, in the range of 12° C. to 300° C. per minute. The fired product thus cooled is washed with an acidic aqueous solution. As in the first firing step, an aqueous solution containing an organic acid or a mineral acid can be used as the acidic aqueous solution. In view of osmotic properties with respect to zinc sulfide and surface persistence properties, acetic acid or hydrochloric acid may be preferably used. After being washed with an acidic aqueous solution, the fired product is washed with ion exchanged water until the washing liquid becomes neutral.

Preferably, the fired product obtained from the first firing step is subjected to the second firing step after it is washed and distortion is created in a crystal. A method for creating the distortion to a crystal is not particularly limited. For example, distortion can be created in a crystal by externally applying shock to a bulk form of the fired product by means of a shock wave, a press or the like. However, application of excessively strong shock is not preferred, because it may induce destruction of a crystal or particle and, as a result, the brightness of the phosphor may be decreased. Thus, distortion may be preferably created in a crystal by applying modest shock by means of ultrasonication, ball milling or the like. A period of time for the application of shock is not particularly limited. Typically, the application of shock is carried out for 10 minutes to 3 hours, more preferably 15 minutes to 2 hours. Preferably, the washing and the creation of distortion are carried out simultaneously.

The fired product obtained from the first firing step is preferably subjected to the second firing step after a compound containing copper, zinc, and sulfur is added to the fired product. The above-mentioned substances are preferably added to provide the resulting fired product comprising 0.1 to 5% by weight of a copper salt, 1 to 45% by weight of a zinc compound, and 0.1 to 6% by weight of sulfur.

Examples of copper salts that may be used in the present invention include copper(I) chloride, copper(II) chloride, copper sulfate, and copper acetate. These copper salts may be used singly, or alternatively a plurality of copper salts may be used in combination. From viewpoints of economical efficiency and operability, copper sulfate or copper acetate may be preferably used.

Examples of zinc compounds that may be used in the present invention include zinc oxide, zinc sulfide, zinc chloride, zinc bromide, zinc sulfate, zinc nitrate, zinc acetate, and a salt with formic acids. These zinc compounds may be used singly, or alternatively a plurality of zinc compounds may be used in combination. From viewpoints of economical efficiency and operability, zinc sulfate or zinc oxide may be preferably used.

Examples of sulfur-containing compounds that may be used in the present invention include sulfur, thioacetamide, and thiourea. These sulfur-containing compounds may be used singly, or alternatively a plurality of sulfur-containing compounds may be used in combination. From viewpoints of economical efficiency and operability, sulfur may be preferably used.

In the present invention, the second firing step may be repeatedly conducted two or more times. When more than one second firing step is carried, the last one is preferably carried out at a temperature lower than that in the previous one. The firing at such a low temperature may result in stabilization of crystal properties and improvement in phosphorescence properties of a zinc sulfide based phosphor.

After the second firing step is completed, the resulting zinc sulfide based phosphor particles are subjected to washing treatment to remove excess zinc compounds that are not consumed for doping, or other blackened metal compounds. Neutral or acidic water is used in the washing. An acid component that may be contained in the acidic water is not particularly limited. Examples of such acid components include mineral acids such as hydrochloric acid, sulfuric acid, nitric acid, and phosphoric acid, and organic acids such as acetic acid, propionic acid, and butyric acid. Any of these acids may be used in the form of an aqueous solution. These acid components may be used singly, or alternatively a plurality of these acid components may be used in combination.

A zinc sulfide based phosphor may be decomposed when it is brought into contact with a high-concentration acidic substance. Thus, typically, when acidic water is used, it is preferably an aqueous solution containing 0.1 to 20% by weight of an acid component; an aqueous solution containing 1 to 10% by weight of an acid component may be more preferably used. In view of decomposition of the zinc sulfide based phosphor and surface ion persistence properties, acetic acid may be preferably used.

In the present invention, residual copper, silver, gold, manganese, iridium, and rare-earth elements can be removed with a cyanide solution. From a viewpoint of availability and the like, sodium cyanide and potassium cyanide are typically used as the cyanide. An aqueous solution containing a cyanide at a concentration of 0.1 to 1% by weight is used in an amount of 10 to 100 parts by weight per part by weight of the zinc sulfide based phosphor. After the washing, to eliminate residual cyanide for the sake of safety, additional washing treatment may be preferably carried out with ion exchanged water until no cyanide ion is detected. The washing treatment is followed by drying such as vacuum drying or hot air drying, so that a phosphor can be obtained as a final product.

The phosphor precursor used in the present invention is not particularly limited, and any phosphor precursor having zinc sulfide as a host compound can be used. However, since it is preferable that metal dopants be distributed in the zinc sulfide host as uniformly as possible, a zinc sulfide based phosphor precursor is suitably obtained by adding to an organic solvent an aqueous solution containing a zinc compound, a sulfurizing agent, and a metal compound including at least one metal element selected from the group consisting of copper, silver, gold, manganese, iridium, and rare-earth elements, to prepare a reaction mixture liquid, and heating the reaction mixture liquid to form an azeotrope of the water and the organic solvent while removing water.

Examples of zinc compounds that may be suitably used to prepare the phosphor precursor include salts of mineral acids such as hydrochloric acid, sulfuric acid, nitric acid, and phosphoric acid, salts of organic acids such as formic acid, acetic acid, butyric acid, and oxalic acid, and complex salts such as acetylacetonate. In view of stability and persistence properties of compounds after removal of water from the solvent contained in the reaction mixture liquid by azeotropic dehydration, an organic acid salt may be preferably used. These zinc compounds may be used singly, or alternatively some of zinc compounds may be used in combination.

The metal compound containing at least one metal element selected from the group consisting of copper, silver, gold, manganese, iridium, and rare-earth elements is not particularly limited, and includes a salt of a mineral acid such as hydrochloric acid, sulfuric acid, nitric acid, and phosphoric acid, a salt of an organic acid such as formic acid, acetic acid, butyric acid, and oxalic acid, or a complex salt of a ligand such as an acetylacetonato ligand. In view of stability and persistence properties of compounds after water is removed from the reaction mixture liquid by azeotropic dehydration, use of an organic acid salt is preferred. These compounds may be used singly, or alternatively some of these compounds may be used in combination.

As necessary, a compound containing an element such as aluminum, gallium, and indium, which act as a donor with respect to an acceptor element including copper, silver, manganese, iridium, and rare-earth elements, may be present in the aqueous solution so that such donor elements are incorporated into a sulfide.

The sulfurizing agent that may be used in the present invention is not particularly limited, and includes hydrogen sulfide, an alkali metal sulfide such as sodium sulfide and potassium sulfide, thioamides such as thioacetamide and thioformamide, thiourea or the like. In view of decomposition temperature, stability, and persistence properties of decomposed products, use of hydrogen sulfide, thioacetamide, or thiourea is preferred. Thioacetamide and/or hydrogen sulfide are especially preferred.

With regard to the water used to provide an aqueous solution containing the zinc compound, the sulfurizing agent and the like, it is necessary to eliminate any negative effects of impurities contained in the water on formation of zinc sulfide based phosphor. Typically, the water to be used in the present invention is ion exchanged water having an ash content of 100 ppm or lower, more preferably 10 ppm or lower.

In the present invention, the concentration of the zinc compound in an aqueous solution as prepared would not cause a problem in relation to uniformity of distribution of metal dopants, as long as the zinc compound is dissolved completely. However, an excessively high concentration of the zinc compound is not preferred, as a reaction product may be deposited to provide inhibition of the reaction and decrease in a rate of the reaction rate. An excessively low concentration is also not preferred, as volumetric efficiency may be decreased significantly. Accordingly, the concentration of the zinc compound may be preferably adjusted to 0.01 to 2 mol/L, more preferably 0.1 to 1.5 mol/L.

In the present invention, the compound containing copper, silver, gold, manganese, iridium, and a rare-earth element, and the compound containing an element that acts as a donor with respect to acceptor elements including copper, silver, gold, manganese, iridium, and a rare-earth element may be used in an amount that corresponds to a weight of doping metal element in the range of 0.1 to 150000 ppm, more preferably in the range of 1 ppm to 50000 ppm, based on the weight of the resulting phosphor precursor. In view of an inclusion effect and economical efficiency, a preferable range is 2 to 10000 ppm. The compounds containing the abovementioned element(s) also may be present in an aqueous solution in which the zinc compound is also dissolved.

The sulfurizing agent may be used in a molar amount that corresponds to 0.5- to 5-fold the molar amount of the zinc element contained in the zinc compound. However, when the zinc compound remains unreacted, it adversely affects the reaction and consequently the resulting phosphor product; for example, color purity of the phosphor product may be decreased, and the phosphor product may have a limited use.

Thus, the sulfurizing agent is typically used in an molar amount that corresponds to 1.1- to 4-fold, more preferably 1.1- to 2-fold the molar amount of the zinc element. The sulfurizing agent may be also used in the form of an aqueous solution of the zinc compound.

The concentration of the sulfurizing agent in the aqueous solution would not cause a problem in relation to uniformity of distribution of metal dopants, as long as the sulfurizing agent is soluble in the aqueous solution. However, an excessively high concentration of the sulfurizing agent is not preferred, since the unreacted sulfurizing agent is deposited and remains in an intended product. An excessively low concentration is also not preferred, since the unreacted zinc compound is deposited and remains in an intended product. Thus, the concentration of the sulfurizing agent is adjusted to 0.01 to 2 mol/L, more preferably 0.1 to 1.5 mol/L.

When hydrogen sulfide is used as the sulfurizing agent, the hydrogen sulfide may be dissolved in water before being added simultaneously with the zinc compound, or may be fed continuously as a gas into a reaction liquid. Hydrogen sulfide may be fed to a liquid phase contained in a reactor, or alternatively to a gas phase contained in the reactor.

Organic solvents used in the present invention are not particularly limited, and include any organic solvent from which water can be removed by azeotropic dehydration, for example, saturated hydrocarbons such as hexane, cyclohexane, heptane, octane, cyclooctane, nonane, decane, dodecane, cyclododecane, and undecane; aromatic hydrocarbons such as toluene, xylene, and mesitylene; halogenated hydrocarbons such as carbon tetrachloride, 1,2-dichloroethane, and 1,1,2,2-tetrachloroethylene; halogenated aromatic hydrocarbons such as chlorobenzene and dichlorobenzene; ethers such as dibutyl ether, diisobutyl ether, diamyl ether, diisoamyl ether, dihexyl ether, dicyclohexyl ether, dioctyl ether, dicyclooctyl ether, anisole, phenylethyl ether, phenylpropyl ether, and phenylbutyl ether; alcohols such as butyl alcohol, amyl alcohol, isoamyl alcohol, hexyl alcohol, heptyl alcohol, octyl alcohol, and cyclooctyl alcohol; and esters such as butyl acetate, amyl acetate, isoamyl acetate, butyl butyrate, amyl butyrate, isoamyl butyrate, methyl benzoate, and ethyl benzoate. In view of stability of the organic solvent, safety, water removal efficiency, and loss of sulfides to be purified and raw material salts due to dissolution, a saturated hydrocarbon or aromatic hydrocarbon may be preferably used. From a viewpoint of an azeotropic temperature and a mixing ratio of the azeotrope formed between organic solvent and water, preferable organic solvent is decane, dodecane, or xylene.

The amount of the organic solvent used is not particularly limited, but should be adjusted such that the amount of the organic solvent is greater than the added amount of the aqueous solution containing the zinc compound, whereby the phosphor precursor is consequently formed in the organic solvent.

When the phosphor precursor for use in the present invention is produced, the temperature of heating the reaction mixture liquid can be set to a temperature in the range of 30° C. to 300° C. From viewpoints of safety and operability, the temperature is preferably set as a temperature at which there is no need to use any special experiment facilities, reactor, and the like, i.e., a temperature in the range of 40 to 230° C.; in view of a rate of decomposition of thioacetamide, a temperature in the range of 60° C. to 200° C. is more preferred, and most preferably a temperature in the range of 80° C. to 180° C.

When the phosphor precursor for use in the present invention is produced, the preparation and heating of the reaction mixture can be carried out in any atmosphere. However, when oxygen is present in the atmosphere, it is not possible to perfectly control and inhibit oxidation of the product. Thus, the preparation and heating are preferably carried out in the presence of an inert gas, such as nitrogen and argon, in the presence of hydrogen sulfide gas which also acts as a sulfurizing agent, or alternatively in the presence of any combination of the foregoing gases.

When the phosphor precursor for use in the present invention is produced, the aqueous solution of the raw material compound is added to the organic solvent to prepare the reaction mixture liquid, while water is removed from the reaction mixture liquid by boiling to form an azeotrope of water and organic substance. Zinc metal sulfides deposited in the reaction mixture liquid are separated from the liquid phase medium, optionally subjected to washing such as water washing, and then heated and dried under reduced pressure.

The temperature for drying the phosphor precursor is not particularly limited. Typically, the drying can be carried out at 10° C. to 200° C. However, when even a trace amount of moisture is present, it may cause oxidation of the zinc sulfide host of the phosphor precursor. Thus, the drying treatment is carried out at 150° C. or lower, preferably 50° C. to 120° C.

A zinc sulfide based phosphor precursor used in another aspect of the present invention may be obtained by adding a sulfurizing agent to an aqueous solution containing a zinc compound and a metal compound containing at least one metal element selected from the group consisting of copper, silver, gold, manganese, iridium, and rare-earth elements, and allowing the aqueous solution and the sulfurizing agent to react together in a liquid phase. The zinc compound, the metal compound containing at least one metal element selected from the group consisting of copper, silver, gold, manganese, iridium, and rare-earth elements, and the sulfurizing agent are the same as those described above. The phosphor precursor obtained by the liquid-phase reaction and separated from water is optionally subjected to washing treatment such as water washing and then to drying by heating or under reduced pressure.

A zinc sulfide based phosphor precursor used in a yet another aspect of the present invention may be prepared by mixing zinc sulfide with a metal compound containing at least one metal element selected from the group consisting of copper, silver, gold, manganese, iridium, and rare-earth elements.

Zinc sulfide used in the present invention is not particularly limited, and includes zinc sulfide having any of a cubic system and a hexagonal system. The particle size is also not particularly limited, and primary particles may have a particle size in the range of 10 nm to 20 µm. In a case of an aggregate of primary particles, the particle size may be in the range of 1 µm to 20 µm.

A purity of zinc sulfide used in the present invention is not particularly limited, but zinc sulfide is preferably free of different types of metals, such as iron, nickel, and chromium. Typically, a purity of zinc sulfide used in the invention is 99% or higher.

As necessary, a metal compound containing an element such as aluminum, gallium, and indium, which acts as a donor with respect to an acceptor element including copper, silver, manganese, iridium, or a rare-earth. These metal compounds are also not particularly limited, and include a salt of a mineral acid such as hydrochloric acid, sulfuric acid, nitric acid, and phosphoric acid, a salt of an organic acid such as formic acid, acetic acid, butyric acid, and oxalic acid, or a complex salt with a ligand such as an acetylacetonato ligand. In view of stability and persistence properties of the compounds, a mineral acid salt or an organic acid salt may be preferably used. These salts may be used singly, or some of salts may be used in combination.

A method for mixing to prepare the mixture of the above-mentioned metal compound(s) and zinc sulfide is not particularly limited. The metal compound(s) may be combined with zinc sulfide by physical mixing. Alternatively, the mixture can also be prepared by dissolving in water a metal compound containing at least one metal element selected from the group consisting of copper, silver, gold, manganese, iridium, and rare-earth elements and optionally a compound or compounds containing at least one element that acts as a donor with respect to the acceptor elements as described above and are selected from the group consisting of aluminum, gallium, indium and the like, adding zinc sulfide, and then removing the water.

A quantum efficiency is measured to confirm that a zinc sulfide based phosphor is formed by carrying out the method of the present invention. A quantum efficiency refers to a ratio of a number of photons emitted as a result of excitation induced by incident light to a number of photons of incident light absorbed by a substance. A higher quantum efficiency indicates a higher doping effect. A quantum efficiency can be determined by a fluorescence spectrophotometer.

EXAMPLES

The following non-limiting examples describe the present invention in detail.

Conditions for the determination of quantum efficiencies by a spectrophotometer were as follows.

Measurement apparatus: FP-6500 manufactured by JASCO Corporation

Excitation wavelength: 350 nm

Excitation band width: 5 nm

Software: Spectra Manager for Windows (registered trademark) 95/NT Ver 1.00.00 2005 manufactured by JASCO Corporation Reference Example 1

Production Example 1 for Phosphor Precursor

In 500 g of ion exchanged water, 65.9 g of zinc acetate dihydrate, 0.056 g of copper nitrate trihydrate (equivalent to 700 ppm of copper), 0.008 g of gallium nitrate octahydrate (equivalent to 50 ppm of gallium), 45.0 g of thioacetamide, and 5 g of acetic acid were dissolved. A 2-liter three-neck flask was equipped with a Dean-Stark apparatus, a reflux tube, a thermometer, and a stirrer. Eight hundreds milliliters of o-xylene was placed, and the system was purged with nitrogen. The temperature in an oil bath was adjusted to 150° C., and the o-xylene in the reactor was heated to 130° C. Thereafter, a solution containing zinc acetate was added at a rate of 100 ml/hr and distillate water was removed by the Dean-Stark apparatus while the reaction was allowed to proceed. All the aqueous solution was fed over about 6 hours, and then moisture in the system was removed for another 30 minutes. After the system was cooled to room temperature, a resulting sulfide was allowed to precipitate, and the organic solvent was removed to recover an intended product, which was subjected to drying in a vacuum dryer at 100° C. for 12 hours. An amount of the product recovered was 28.9 g, which corresponds to 98% of a theoretical amount.

Reference Example 2

Production Example 2 for Phosphor Precursor

In a 3-liter three-neck flask equipped with a stirrer, a thermometer, a reflux tube, and a solid feeder, and 297.6 g of zinc nitrate hexahydrate, 0.186 g of copper nitrate trihydrate (equivalent to 500 ppm of copper), 0.022 g of diammonium iridium hexachloride (equivalent to 100 ppm of iridium) were placed. One thousand grams of ion exchanged water was added to prepare a solution containing the zinc nitrate hexahydrate, copper nitrate trihydrate, and diammonium iridium hexachloride dissolved in the ion exchanged water. Then, 60% nitric acid was added to adjust a pH of the system to 2. After purging of the system with nitrogen, the system was heated to 90° C. When the temperature within the system reached a predetermined temperature, 113.0 g of thioacetamide was introduced from the solid feeder to initiate the reaction. After the reaction was continued for 2 hours, the system was cooled to room temperature, and then a resulting sulfide was allowed to precipitate and a supernatant liquid was removed by decantation. Then, the system was washed with 3 L of ion exchanged water until the system has a pH value within a neutral range. An intended product was recovered and dried in a vacuum dryer at 100° C. for 12 hours. An amount of the product recovered was 94.16 g, which corresponds to 96.6% of a theoretical amount.

Reference Example 3

Production Example 3 for Phosphor Precursor

In a 100-ml mixer vessel of THINKEY (ARE-250), 100 g of zinc sulfide (RAK-N, commercially available from Sakai Chemical Industry Co., Ltd.) and 0.20 g of copper acetate trihydrate (equivalent to 500 ppm of copper) were placed, and ground and mixed for 30 minutes.

Comparative Example 1

To 27 g of the product obtained in Reference Example 1, 1.00 g of potassium chloride, 1.17 g of sodium chloride, and 6.87 g of magnesium chloride hexahydrate were added and mixed together in a ball mill. To this mixture, 1.45 g of sulfur was added, and the resulting mixture was placed in a crucible. Thereafter, the crucible was placed in a firing furnace and heated in a nitrogen atmosphere at a rate of temperature increase of 400° C./hr. The furnace temperature was increased up to 1100° C. and then maintained for 3 hours. After the furnace temperature was maintained for 3 hours, it was decreased to room temperature.

The resulting fired product was added to 200 g of 15% acetic acid solution and dispersed. The acetic acid solution was removed by decantation, and the fired product was washed with 500 g of ion exchanged water until the washing liquid became neutral. The ion exchanged water was removed, and then vacuum drying was carried out at 100° C. for 12 hours to obtain 24 g of a fired product from the first firing step.

This fired product was placed in a crucible, and then the crucible was placed in the firing furnace and heated in a nitrogen atmosphere at a rate of temperature increase of 400° C./hr. After the heating was completed, the furnace temperature was maintained for 3 hours and then decreased to room temperature.

The fired product thus cooled was dispersed and washed in 200 g of an aqueous solution of 5% hydrochloric acid. The acidic aqueous solution was removed, and the fired product was washed with 500 g of ion exchanged water until the washing liquid became neutral. The ion exchanged water was decanted, and then the fired product was washed with 200 g of an aqueous solution of 1% sodium cyanide to remove excess sulfides. The fired product was further washed with the ion exchanged water until the washing liquid became neutral, and then subjected to vacuum drying at 100° C. for 12 hours to obtain 22 g of a fired product from the second firing step. The resulting fired product (phosphor) was subjected to measurement of a spectrum of light-induced fluorescence. A fluorescence spectrum of the phosphor is shown in FIG. 1. A quantum yield of the phosphor is shown in Table 1.

To 1.5 g of the phosphor thus obtained, 1.0 g of a fluorine based binder (7155, commercially available from DuPont) was added as a binder, followed by mixing and defoaming, to prepare a light-emitting layer paste. The resulting paste was applied on an ITO coated PET film by screen printing with a 20-mm square screen printing plate (200-mesh, 25 µm) to form a film having a thickness of 40 µm. Additionally, a layer of barium titanate (7153, commercially available from DuPont) was applied by screen printing with a screen printing plate (150-mesh, 25 µm) and dried at 100° C. for 10 minutes, and then another layer was applied and dried at 100° C. for 10 minutes to form a dielectric layer having a thickness of 20 µm. On an upper surface of the dielectric layer, a layer of a silver paste (461SS, commercially available from Acheson) was applied by screen printing with a screen printing plate (150-mesh, 25 µm) and dried at 100° C. for 10 minutes to provide an electrode as a constituent of a printed EL device. The device thus obtained was subjected to EL brightness measurement at 200 V and 1 kHz for material evaluation in terms of EL performance. The results are shown in Table 2.

Comparative Example 2

Figure 2:
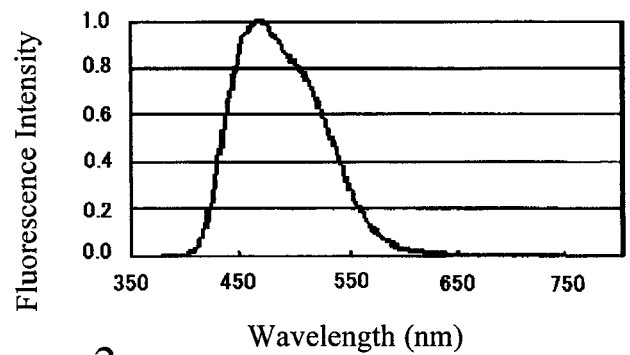
FIG. 2 shows a fluorescence spectrum (emission peak wavelength: 461 nm) of a phosphor obtained in Comparative Example 2.

The procedure of Comparative Example 1 was repeated, except that 1.00 g of potassium chloride, 1.17 g of sodium chloride, and 6.87 g of magnesium chloride hexahydrate were added to 27 g of the product obtained in Reference Example 2 and mixed with a ball mill. A quantum efficiency and a fluorescence spectrum of the resulting phosphor were measured. Further, a printed EL device was produced and tested for material evaluation in terms of EL performance. The results are shown in Table 1, FIG. 2, and Table 2.

Comparative Example 3

Figure 3:
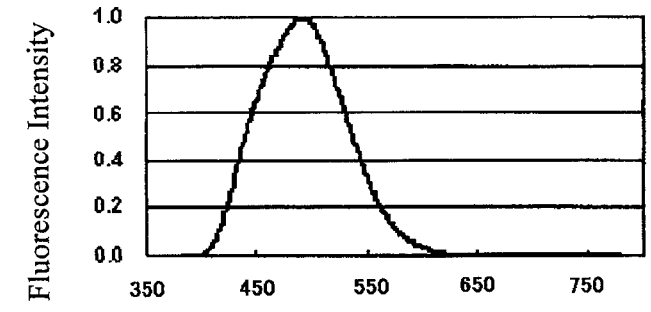
FIG. 3 shows a fluorescence spectrum (emission peak wavelength: 466 nm) of a phosphor obtained in Comparative Example 3.

The procedure of Comparative Example 1 was repeated, except that 1.00 g of potassium chloride, 1.17 g of sodium chloride, and 6.87 g of magnesium chloride hexahydrate were added to 27 g of the product obtained in Reference Example 3 and mixed with a ball mill. A quantum efficiency and a fluorescence spectrum of the resulting phosphor were measured. Further, a printed EL device was produced and tested for material evaluation in terms of EL performance. The results are shown in Table 1, FIG. 3, and Table 2.

Example 1

To 27 g of the product obtained in Reference Example 1, 1.00 g of potassium chloride, 1.17 g of sodium chloride, and 6.87 g of magnesium chloride hexahydrate were added and mixed with a ball mill. To this mixture, 1.45 g of sulfur was added, and the resulting mixture was placed in a crucible. Thereafter, the crucible was placed in a firing furnace and heated at a rate of 400° C./hr in an atmosphere into which an air stream was introduced. When the temperature in the furnace reached 800° C., the inflowing gas was switched from the air to nitrogen, and the furnace temperature was increased up to 1100° C. and then maintained for 3 hours. After the furnace temperature was maintained for 3 hours, it was decreased to room temperature at a rate of 500° C./hr.

The resulting fired product was added to 200 g of a 15% acetic acid solution and dispersed. The acetic acid solution was removed by decantation, and the fired product was washed with 500 g of ion exchanged water until the washing liquid became neutral, whereby a fired product was obtained. The ion exchanged water was removed, and then vacuum drying was carried out at 100° C. for 12 hours to obtain 24 g of a fired product from the first firing step.

This fired product was placed in a crucible, and then the crucible was placed in a firing furnace and heated in a nitrogen atmosphere at a rate of 400° C./hr. Thereafter, when the inside of the firing furnace reached 850° C., the inflowing gas was changed from nitrogen to air, and the air was introduced for 1 hour. Subsequently, the inflowing gas was switched to nitrogen, and the furnace temperature was maintained for 2 hours and then decreased to room temperature at a rate of 500° C./hr.

Figure 4:
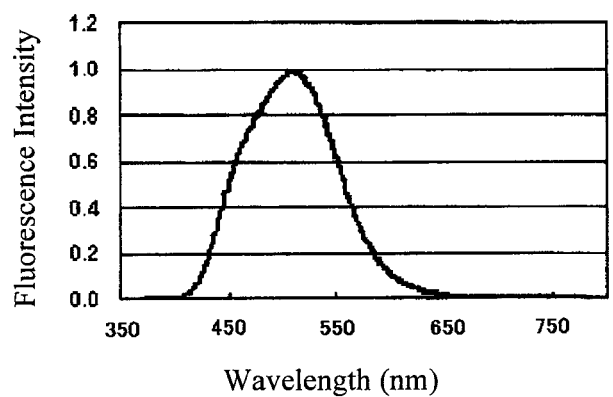
FIG. 4 shows a fluorescence spectrum (emission peak wavelength: 477 nm) of a phosphor obtained in Example 1.

The fired product thus cooled was dispersed and washed in 200 g of an aqueous solution of 5% hydrochloric acid. The acidic aqueous solution was removed, and the fired product was washed with 500 g of ion exchanged water until the washing liquid became neutral. The ion exchanged water was decanted, and then the fired product was washed with 200 g of an aqueous solution of 1% sodium cyanide to remove excess sulfides. The fired product was further washed with the ion exchanged water until the washing liquid became neutral, and then vacuum drying was carried out at 100° C. for 12 hours to obtain 22 g of a fired product from the second firing step. The fired product (phosphor) thus obtained was subjected to measurement of a spectrum of light-induced fluorescence. A fluorescence spectrum of the phosphor is shown in FIG. 4. A quantum yield of the phosphor is shown in Table 1.

A printed EL device was produced by the same procedure as that in Comparative Example 1 by using 1.5 g of the phosphor thus obtained. The device thus obtained was subjected to EL brightness measurement at 200 V and 1 kHz for material evaluation in terms of EL performance. The results are shown in Table 2.

Example 2

Figure 5:
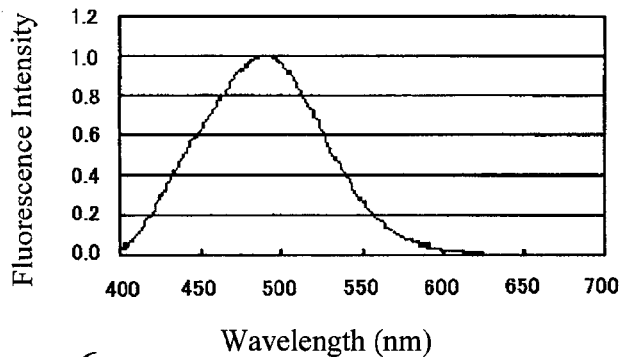
FIG. 5 shows a fluorescence spectrum (emission peak wavelength: 490 nm) of a phosphor obtained in Example 2.

The procedure of Example 1 was repeated using 27 g of the product obtained in Reference Example 2, whereby 25 g of a fired product was obtained from the first firing step. Subsequently, 21 g of a fired product was obtained from the second firing step by the same procedure as that in Example 1. A fired product (phosphor) thus produced was subjected to measurement of a spectrum of light-induced fluorescence. A fluorescence spectrum of the phosphor is shown in FIG. 5. A quantum yield of the phosphor is shown in Table 1. Further, a printed EL device was produced by the same procedure as that in Example 1 by using 1.5 g of the resulting phosphor. The device thus obtained was subjected to EL brightness measurement at 200 V and 1 kHz for material evaluation in terms of EL performance. The results are shown in Table 2.

Example 3

Figure 6:
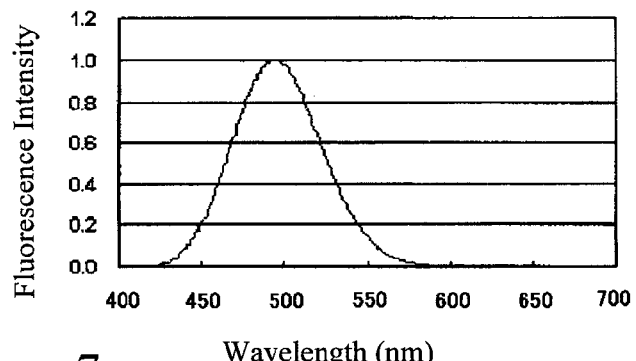
FIG. 6 shows a fluorescence spectrum (emission peak wavelength: 492 nm) of a phosphor obtained in Example 3.

The procedure of Example 1 was repeated using 25 g of the product obtained in Reference Example 3 to obtain 23 g of a fired product from the first firing step. Subsequently, 21 g of a fired product was obtained from the second firing step by the same procedure as that in Example 1. The fired product (phosphor) thus obtained was subjected to measurement of a spectrum of light-induced fluorescence. A fluorescence spectrum of the phosphor is shown in FIG. 6. A quantum yield of the phosphor is shown in Table 1. Further, a printed EL device was produced by the same procedure as that in Example 1 using 1.5 g of the phosphor. The device thus obtained was subjected to EL brightness measurement at 200 V and 1 kHz for material evaluation in terms of EL performance. The results are shown in Table 2.

Comparative Example 4

Figure 7:
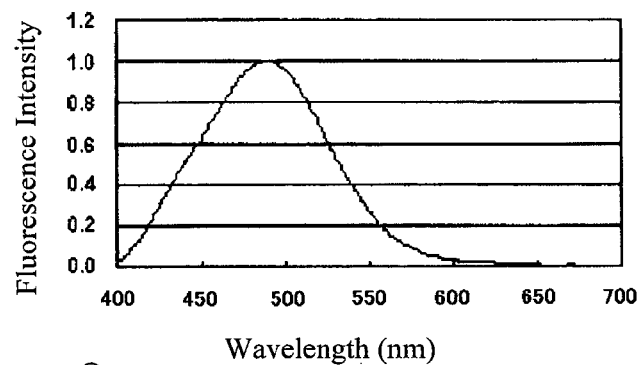
FIG. 7 shows a fluorescence spectrum (emission peak wavelength: 493 nm) of a phosphor obtained in Comparative Example 4.

To 27 g of the product obtained in Reference Example 1, 1.00 g of potassium chloride, 1.17 g of sodium chloride, and 6.87 g of magnesium chloride hexahydrate were added and mixed with a ball mill. To this mixture, 1.45 g of sulfur was added, and the resulting mixture was placed in a crucible. Thereafter, the crucible was placed in a firing furnace and heated at a rate of 400° C./hr in an atmosphere into which an air stream was introduced. When the temperature in the furnace reached 300° C., the inflowing gas was switched from the air to nitrogen without causing the crystal system transformation of the host compound zinc sulfide, and the furnace temperature was increased up to 1100° C. and then maintained at this temperature for 3 hours. Subsequently, the furnace temperature was decreased to room temperature at a rate of 500° C./hr. The following operations were carried out as in Example 1. A quantum efficiency and a fluorescence spectrum of the phosphor thus obtained were measured. Further, a printed EL device was produced and tested for material evaluation in terms of EL performance. The results are shown in Table 1, FIG. 7, and Table 2.

Comparative Example 5

Figure 8:
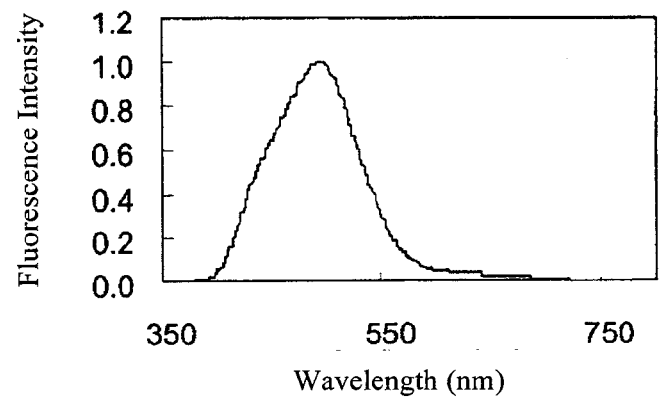
FIG. 8 shows a fluorescence spectrum (emission peak wavelength: 492 nm) of a phosphor obtained in Comparative Example 5.

To 27 g of the product obtained in Reference Example 1, 1.00 g of potassium chloride, 1.17 g of sodium chloride, and 6.87 g of magnesium chloride hexahydrate were added and mixed with a ball mill. To this mixture, 1.45 g of sulfur was added, and the resulting mixture was placed in a crucible. Thereafter, the crucible was placed in a firing furnace and heated at a rate of 400° C./hr in an atmosphere into which an air stream was introduced. When the temperature in the furnace reached 900° C., the inflowing gas was switched from the air to nitrogen, and the furnace temperature was increased up to 1100° C. and then maintained at this temperature for 3 hours. Subsequently, the furnace temperature was decreased to room temperature at a rate of 500° C./hr. The following operations were carried out as in Example 1. A quantum efficiency and a fluorescence spectrum of the phosphor thus obtained were measured. Further, a printed EL device was produced and tested for material evaluation in terms of EL performance. The results are shown in Table 1, FIG. 8, and Table 2.

Comparative Example 6

Figure 9:
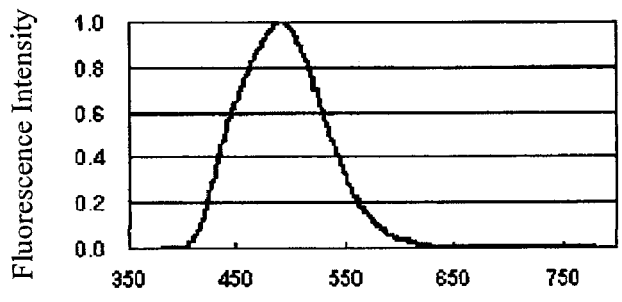
FIG. 9 shows a fluorescence spectrum (emission peak wavelength: 484 nm) of a phosphor obtained in Comparative Example 6.

To 27 g of the product obtained in Reference Example 1, 1.00 g of potassium chloride, 1.17 g of sodium chloride, and 6.87 g of magnesium chloride hexahydrate were added and mixed with a ball mill. To this mixture, 1.45 g of sulfur was added, and the resulting mixture was placed in a crucible. Thereafter, the crucible was placed in a firing furnace and heated at a rate of 400° C./hr in an atmosphere into which an air stream was introduced. When the temperature in the furnace reached 800° C., the inflowing gas was switched from the air to nitrogen, and the furnace temperature was increased up to 1250° C. and then maintained at this temperature for 3 hours. Subsequently, the furnace temperature was decreased to room temperature at a rate of 500° C./hr. The following operations were carried out as in Example 1. A quantum efficiency and a fluorescence spectrum of the phosphor thus obtained were measured. Further, a printed EL device was produced and tested for material evaluation in terms of EL performance. The results are shown in Table 1, FIG. 9, and Table 2.

Comparative Example 7

Figure 10:
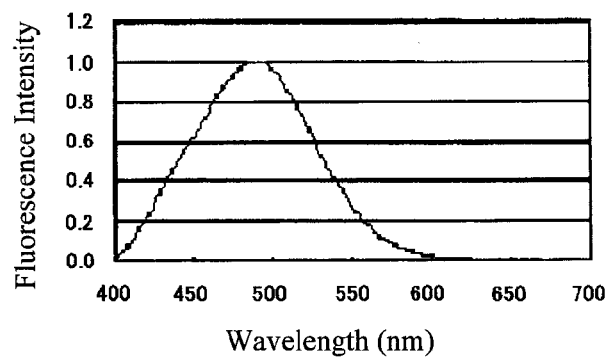
FIG. 10 shows a fluorescence spectrum (emission peak wavelength: 489 nm) of a phosphor obtained in Comparative Example 7.

To 27 g of the product obtained in Reference Example 1, 1.00 g of potassium chloride, 1.17 g of sodium chloride, and 6.87 g of magnesium chloride hexahydrate were added and mixed with a ball mill. To this mixture, 1.45 g of sulfur was added, and the resulting mixture was placed in a crucible. Thereafter, the crucible was placed in a firing furnace and heated in an air stream-introduced atmosphere at a rate of 400° C./hr. When the temperature in the furnace reached 300° C., the inflowing gas was switched from the air to nitrogen, and the furnace temperature was increased up to 1100° C. and then maintained at this temperature for 3 hours. Subsequently, the crucible was allowed to stand and cooled to room temperature. The cooling took 8 hours. The following operations were carried out as in Example 1. A quantum efficiency and a fluorescence spectrum of the phosphor thus obtained were measured. Further, a printed EL device was produced and tested for material evaluation in terms of EL performance. The results are shown in Table 1, FIG. 10, and Table 2.

Comparative Example 8

Figure 11:
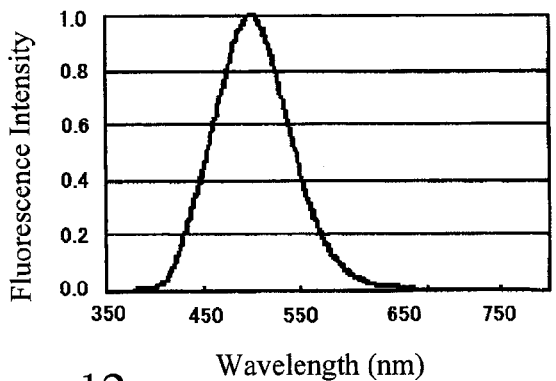
FIG. 11 shows a fluorescence spectrum (emission peak wavelength: 472 nm) of a phosphor obtained in Comparative Example 8.

The first firing step was carried out as in Example 1. The procedure of Example 1 was repeated, except that the second firing step was not carried out after the first firing step. A quantum efficiency and a fluorescence spectrum of the phosphor thus obtained were measured. Further, a printed EL device was produced and tested for material evaluation in terms of EL performance. The results are shown in Table 1, FIG. 11, and Table 2.

Example 4

Figure 12:
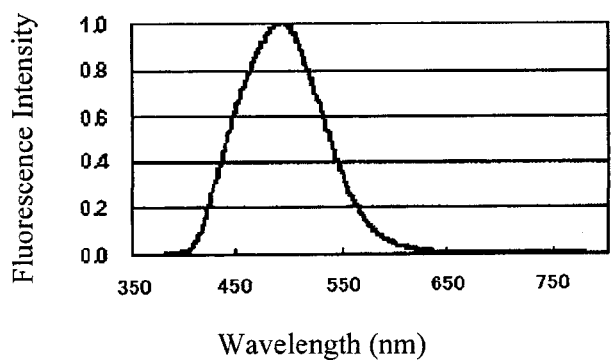
FIG. 12 shows a fluorescence spectrum (emission peak wavelength: 477 nm) of a phosphor obtained in Example 4.

The first firing step was carried out as in Example 1. One hundred grams of a fired product obtained after the washing was dispersed into ion exchanged water, and subjected to ultrasonication for 30 minutes by an ultrasonic vibrator (Digital Sonifier, manufactured by BRANSON) with an output of 60%. The ion exchanged water was removed, and then vacuum drying was carried out at 100° C. for 12 hours to obtain 24 g of a fired product from the first firing step. Then, the second firing step was carried out as in Example 1, followed by washing to obtain a fired product (phosphor). A quantum efficiency and a fluorescence spectrum of the phosphor thus obtained were measured. Further, a printed EL device was produced and tested for material evaluation in terms of EL performance. The results are shown in Table 1, FIG. 12, and Table 2.

Example 5

Figure 13:
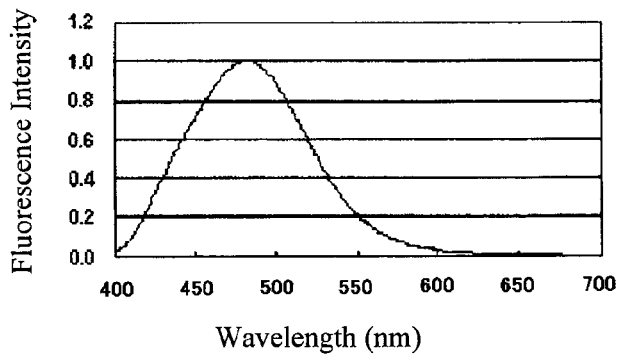
FIG. 13 shows a fluorescence spectrum (emission peak wavelength: 484 nm) of a phosphor obtained in Example 5.

The first firing step was carried out as in Example 1. One hundred grams of a fired product obtained after the washing was dispersed into ion exchanged water, and subjected to ultrasonication for 30 minutes by an ultrasonic vibrator (Digital Sonifier, manufactured by BRANSON) with an output of 60%. The ion exchanged water was removed, and then vacuum drying was carried out at 100° C. for 12 hours to obtain 24 g of a fired product of the first firing step. To this fired product, 0.24 g of copper acetate, 3.6 g of zinc sulfate, and 0.4 g of sulfur were added and mixed together, and then the second firing step was carried out as in Example 1, followed by washing to obtain a fired product (phosphor). A quantum efficiency and a fluorescence spectrum of the phosphor thus obtained were measured. Further, a printed EL device was produced and tested for material evaluation in terms of EL performance. The results are shown in Table 1, FIG. 13, and Table 2.

Example 6

Figure 14:
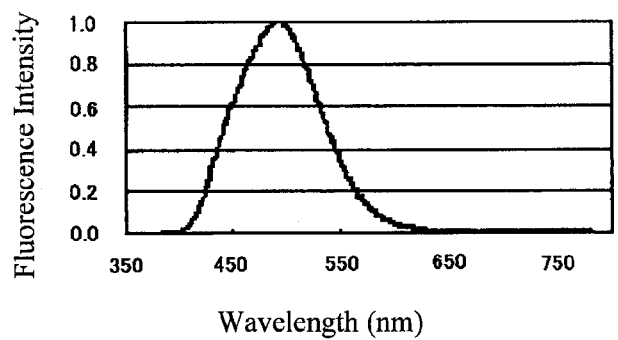
FIG. 14 shows a fluorescence spectrum (emission peak wavelength: 479 nm) of a phosphor obtained in Example 6.

The first firing step was carried out as in Example 2. To 25 g of a fired product obtained as a result of the washing, 50 g of methanol was added. Then, 10 g of ceramic balls having a diameter of 1 mm was added, and shock was applied to the mixture by means of a ball milling machine (manufactured by FRITSCH, Puluerisette) for 30 minutes at 100 revolutions per minute. After the methanol was removed, vacuum drying was carried out at 100° C. for 12 hours to obtain 25 g of a fired product from the first firing step. Thereafter, the second firing step was carried out as in Example 2, and a fired product (phosphor) was obtained after the washing. A quantum efficiency and a fluorescence spectrum of the phosphor thus obtained were measured. Further, a printed EL device was produced and tested for material evaluation in terms of EL performance. The results are shown in Table 1, FIG. 14, and Table 2.

Example 7

Figure 15:
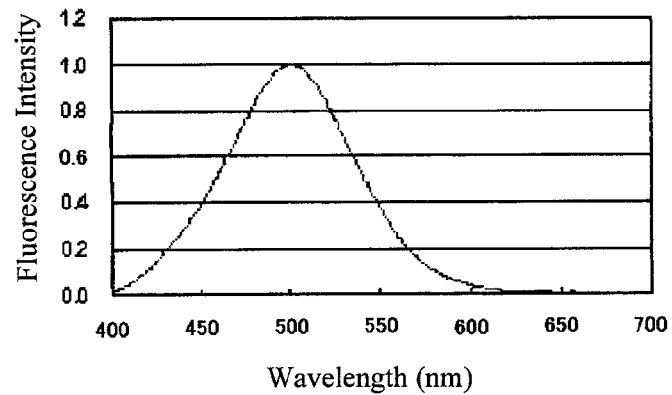
FIG. 15 shows a fluorescence spectrum (emission peak wavelength: 499 nm) of a phosphor obtained in Example 7.

The first firing step was carried out as in Example 2. To 25 g of a fired product obtained as a result of the washing, 50 g of methanol was added. Then, 10 g of ceramic balls having a diameter of 1 mm was added, and shock was applied to the mixture by means of a ball milling machine (manufactured by FRITSCH, Puluerisette) for 30 minutes at 100 revolutions per minute. After the methanol was removed, vacuum drying was carried out at 100° C. for 12 hours to obtain 25 g of a fired product from the first firing step. To this fired product, 0.25 g of copper acetate, 3.8 g of zinc sulfate, and 0.4 g of sulfur were added and mixed together, and then the second firing step was carried out as in Example 2, followed by washing to obtain a fired product (phosphor). A quantum efficiency and a fluorescence spectrum of the phosphor thus obtained were measured. Further, a printed EL device was produced and tested for material evaluation in terms of EL performance. The results are shown in Table 1, FIG. 15, and Table 2.

Example 8

Figure 16:
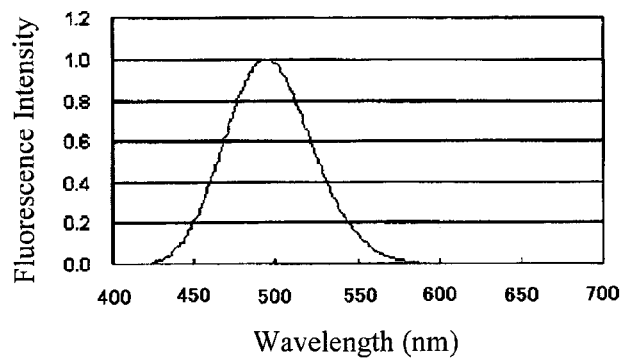
FIG. 16 shows a fluorescence spectrum (emission peak wavelength: 495 nm) of a phosphor obtained in Example 8.

The first firing step was carried out as in Example 3. To 25 g of a fired product obtained as a result of the washing, 50 g of methanol was added. Then, 10 g of ceramic balls having a diameter of 1 mm was added, and shock was applied to the mixture by means of a ball milling machine (manufactured by FRITSCH, Puluerisette) for 30 minutes at a rate of 100 revolutions/min. The methanol was removed, and then vacuum drying was carried out at 100° C. for 12 hours to obtain 23.3 g of a fired product from the first firing step. Then, the second firing step was carried out as in Example 3, followed by washing to obtain a fired product (phosphor). A quantum efficiency and a fluorescence spectrum of the phosphor thus obtained were measured. Further, a printed EL device was produced and tested for material evaluation in terms of EL performance. The results are shown in Table 1, FIG. 16, and Table 2.

Example 9

Figure 17:
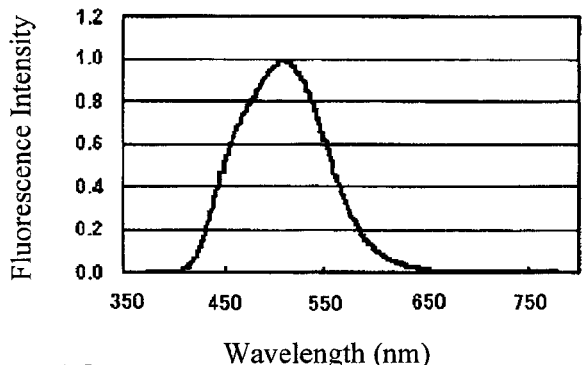
FIG. 17 shows a fluorescence spectrum (emission peak wavelength: 502 nm) of a phosphor obtained in Example 9.

The first firing step was carried out as in Example 3. To 25 g of a fired product obtained as a result of the washing, 50 g methanol was added. Then, 10 g of ceramic balls having a diameter of 1 mm was added, and shock was applied to the mixture by means of a ball milling machine (manufactured by FRITSCH, Puluerisette) for 30 minutes at a rate of 100 revolutions/min. The methanol was removed, and then vacuum drying was carried out at 100° C. for 12 hours to obtain 25 g of a fired product from the first firing step. To this fired product, 0.22 g of copper acetate, 3.4 g of zinc sulfate, and 0.4 g of sulfur were added and mixed together, and then the second firing step was carried out as in Example 3, followed by washing to obtain a fired product (phosphor). A quantum efficiency and a fluorescence spectrum of the phosphor thus obtained were measured. Further, a printed EL device was produced and tested for material evaluation in terms of EL performance. The results are shown in Table 1, FIG. 17, and Table 2.

Example 10

Figure 18:
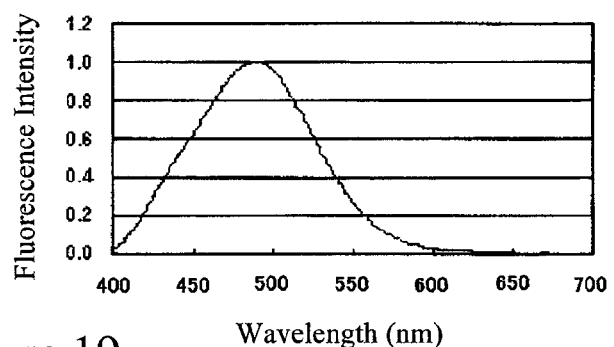
FIG. 18 shows a fluorescence spectrum (emission peak wavelength: 486 nm) of a phosphor obtained in Example 10.

The procedure of Example 5 was repeated, except that a highest reached temperature in the furnace was 1150° C. and the fired product was maintained for 1.5 hours in the first firing step, so that a fired product (phosphor) was obtained from the second firing step. A quantum efficiency and a fluorescence spectrum of the phosphor thus obtained were measured. Further, a printed EL device was produced and evaluated in terms of performance of an EL material. The results are shown in Table 1, FIG. 18, and Table 2.

Example 11

Figure 19:
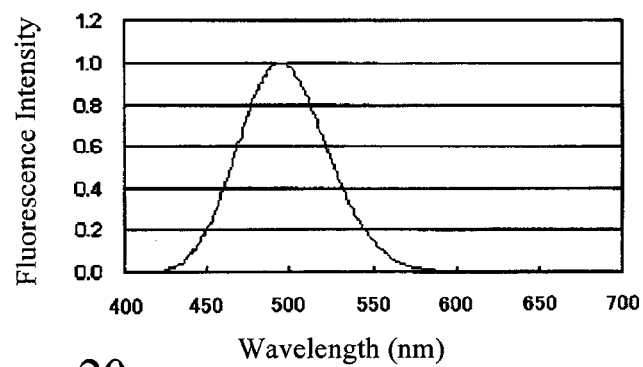
FIG. 19 shows a fluorescence spectrum (emission peak wavelength: 490 nm) of a phosphor obtained in Example 11.

The procedure of Example 5 was repeated, except that the highest reached temperature in the furnace was changed to 800° C. in the second firing step, so that a fired product (phosphor) was obtained from the second firing step. A quantum efficiency and a fluorescence spectrum of the phosphor thus obtained were measured. Further, a printed EL device was produced and tested for material evaluation in terms of EL performance. The results are shown in Table 1, FIG. 19, and Table 2.

Example 12

Figure 20:
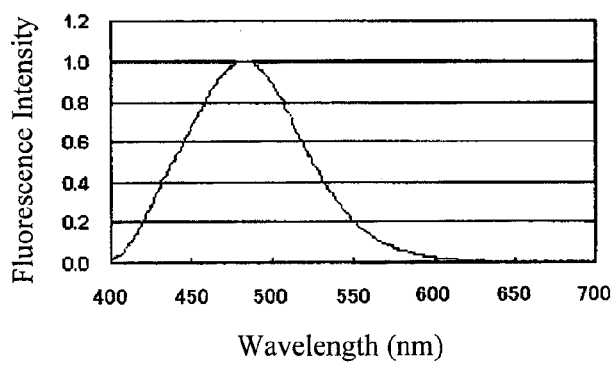
FIG. 20 shows a fluorescence spectrum (emission peak wavelength: 478 nm) of a phosphor obtained in Example 12.

The first firing step was carried out as in Example 5. To a fired product obtained after the washing, 50 g of methanol was added. Then, 10 g of ceramic balls having a diameter of 1 mm was added, and shock was applied to the mixture by means of a ball milling machine (manufactured by FRITSCH, Puluerisette) for 30 minutes at a rate of 100 revolutions/min. The methanol was removed, and then vacuum drying was carried out at 100° C. for 12 hours to obtain 25 g of a fired product from the first firing step. Then, the second firing step was carried out as in Example 5, followed by washing to obtain a fired product (phosphor) from the second firing step. A quantum efficiency and a fluorescence spectrum of the phosphor thus obtained were measured. Further, a printed EL device was produced and tested for material evaluation in terms of EL performance. The results are shown in Table 1, FIG. 20, and Table 2.

Comparative Example 9

Figure 21:
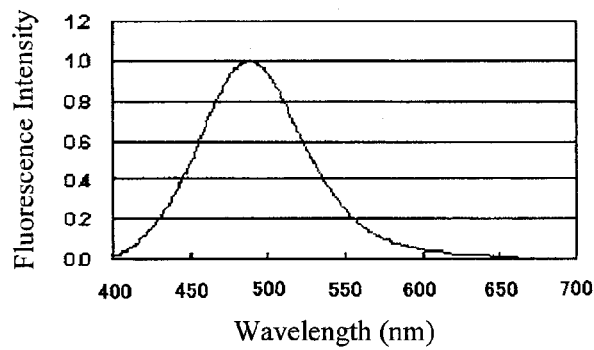
FIG. 21 shows a fluorescence spectrum (emission peak wavelength: 486 nm) of a phosphor obtained in Comparative Example 9.

The procedure of Example 5 was repeated, except that a nitrogen stream, instead of an air stream, was introduced continuously from the beginning of the first firing step, so that a fired product (phosphor) was obtained from the second firing step. A quantum efficiency and a fluorescence spectrum of the phosphor thus obtained were measured. Further, a printed EL device was produced and tested for material evaluation in terms of EL performance. The results are shown in Table 1, FIG. 21, and Table 2.

Comparative Example 10

Figure 22:
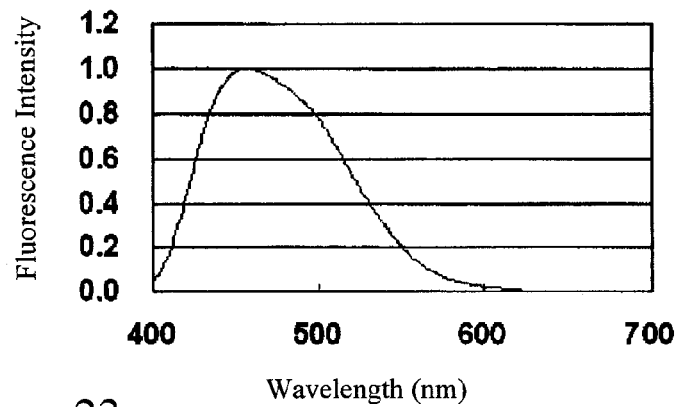
FIG. 22 shows a fluorescence spectrum (emission peak wavelength: 476 nm) of a phosphor obtained in Comparative Example 10.

The procedure of Example 5 was repeated, except that a nitrogen stream, instead of an air stream, was introduced continuously in the second firing step, so that a fired product (phosphor) was obtained from the second firing step. A quantum efficiency and a fluorescence spectrum of the phosphor thus obtained were measured. Further, a printed EL device was produced and tested for material evaluation in terms of EL performance. The results are shown in Table 1, FIG. 22, and Table 2.

Comparative Example 11

Figure 23:
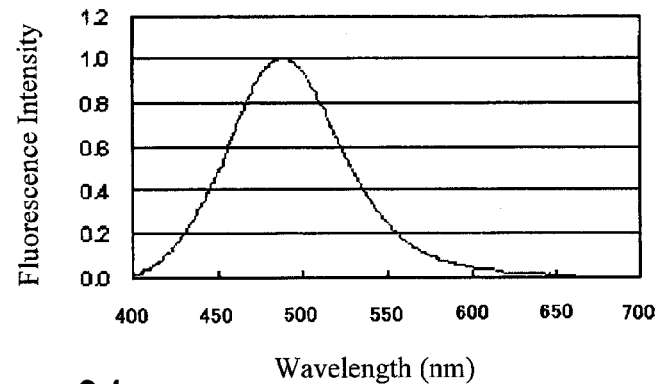
FIG. 23 shows a fluorescence spectrum (emission peak wavelength: 474 nm) of a phosphor obtained in Comparative Example 11.

The procedure of Example 5 was repeated, except that an air stream was constantly introduced from the beginning to the end of the first firing step, so that a fired product (phosphor) was obtained from the second firing step. A quantum efficiency and a fluorescence spectrum of the phosphor thus obtained were measured. Further, a printed EL device was produced and evaluated in terms of an EL material. The results are shown in Table 1, FIG. 23, and Table 2.

Comparative Example 12

Figure 24:
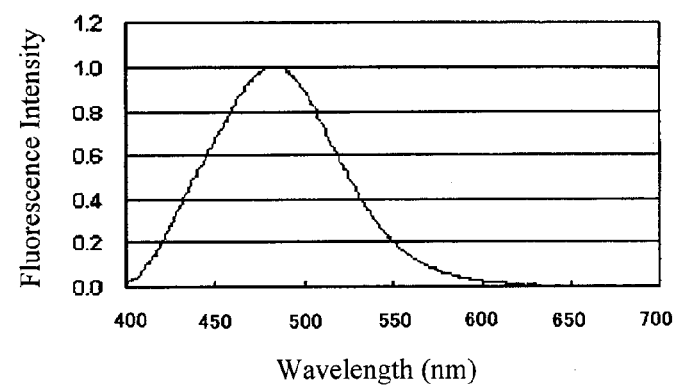
FIG. 24 shows a fluorescence spectrum (emission peak wavelength: 462 nm) of a phosphor obtained in Comparative Example 12.

The procedure of Example 5 was repeated, except that an air stream was constantly introduced from the beginning to the end of the second firing step, so that a fired product (phosphor) was obtained from the second firing step. A quantum efficiency and a fluorescence spectrum of the phosphor thus obtained were measured. Further, a printed EL device was produced and tested for material evaluation in terms of EL performance. The results are shown in Table 1, FIG. 24, and Table 2.

Comparative Example 13

To 27 g of the product obtained in Reference Example 1, 1.00 g of potassium chloride, 1.17 g of sodium chloride, and 6.87 g of magnesium chloride hexahydrate were added and mixed with a ball mill. To this mixture, 1.45 g of sulfur was added, and the resulting mixture was placed in a crucible. Thereafter, the crucible was placed in a firing furnace and heated at a rate of 400° C./hr in an atmosphere into which an air stream was introduced. The furnace temperature was increased up to 1100° C. and then maintained for 3 hours. Subsequently, the furnace temperature was decreased to room temperature at a rate of 500° C./hr.

The fired product thus obtained was added to 200 g of a 15% acetic acid solution and dispersed. The acetic acid solution was removed by decantation, and the fired product was washed with 500 g of ion exchanged water until the washing liquid became neutral, whereby a fired product was obtained. The ion exchanged water was removed, and then vacuum drying was carried out at 100° C. for 12 hours to obtain 10.2 g of a fired product from the first firing step.

This fired product was placed in a crucible, and then the crucible was placed in a firing furnace and heated to 850° C. at a rate of 400° C./hr in an atmosphere into which an air stream was introduced. After the furnace temperature was maintained for 3 hours, it was decreased to room temperature at a rate of 500° C./hr.

Figure 25:
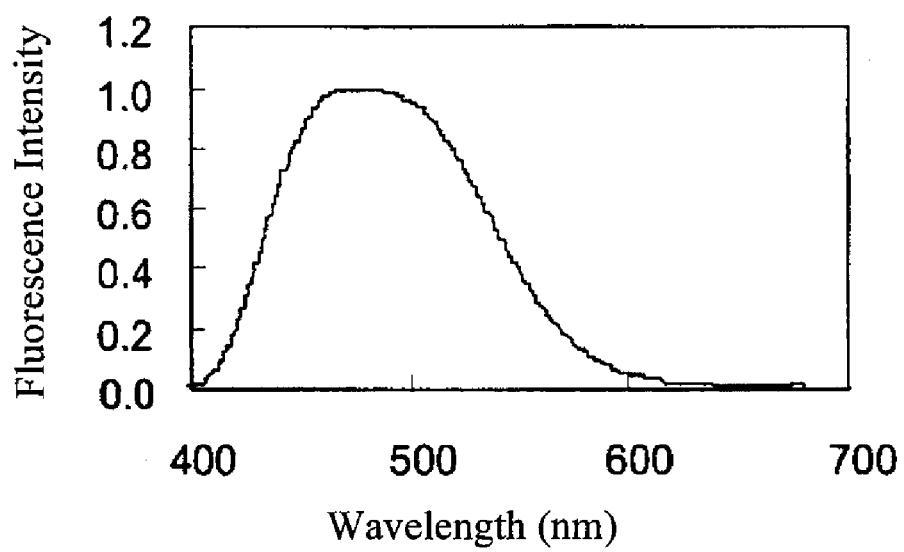
FIG. 25 shows a fluorescence spectrum (emission peak wavelength: 472 nm) of a phosphor obtained in Comparative Example 13.

The fired product thus cooled was dispersed and washed in 200 g of an aqueous solution of 5% hydrochloric acid. The acidic aqueous solution was removed, and the fired product was washed with 500 g of ion exchanged water until the washing liquid became neutral. The ion exchanged water was decanted, and then the fired product was washed with 200 g of an aqueous solution of 1% sodium cyanide to remove excess sulfides. The fired product was further washed with the ion exchanged water until the washing liquid became neutral, and then vacuum drying was carried out at 100° C. for 12 hours to obtain 4.1 g of a fired product from the second firing step. The fired product (phosphor) thus obtained was subjected to measurement of a spectrum of light-induced fluorescence. A fluorescence spectrum of the phosphor is shown in FIG. 25. A quantum yield of the phosphor is shown in Table 1.

A printed EL device was produced by the same procedure as that in Comparative Example 1 by using 1.5 g of the resulting phosphor. The device thus obtained was subjected to EL brightness measurement at 200 V and 1 kHz for material evaluation in terms of EL performance. The results are shown in Table 2.

TABLE 1

Luminescence Quantum Efficiency of Fired Product

|  | Fluorescence Quantum Efficiency (%) |
| --- | --- |
| Comparative Example 1 | 30.3 |
| Comparative Example 2 | 29.9 |
| Comparative Example 3 | 31.1 |
| Example 1 | 40.4 |
| Example 2 | 40.6 |
| Example 3 | 40.9 |
| Comparative Example 4 | 32.2 |
| Comparative Example 5 | 30.3 |
| Comparative Example 6 | 31.0 |
| Comparative Example 7 | 32.1 |
| Comparative Example 8 | 19.1 |
| Example 4 | 43.7 |
| Example 5 | 48.1 |
| Example 6 | 43.2 |
| Example 7 | 46.9 |
| Example 8 | 41.0 |
| Example 9 | 44.3 |
| Example 10 | 45.7 |
| Example 11 | 44.2 |
| Example 12 | 49.1 |
| Comparative Example 9 | 32.7 |
| Comparative Example 10 | 30.3 |
| Comparative Example 11 | 32.2 |
| Comparative Example 12 | 31.1 |
| Comparative Example 13 | 24.1 |

TABLE 2

Material Evaluation of Printed EL Device

|  | Fluorescence Quantum Efficiency (%) | EL brightness (Cd/m$^2$) |
| --- | --- | --- |
| Comparative Example 1 | 32.1 | 108 |
| Comparative Example 2 | 30.6 | 112 |
| Comparative Example 3 | 31.7 | 109 |
| Example 1 | 41.2 | 352 |
| Example 2 | 42.2 | 360 |
| Example 3 | 40.6 | 318 |
| Comparative Example 4 | 33.1 | 141 |
| Comparative Example 5 | 31.1 | 121 |
| Comparative Example 6 | 31.1 | 102 |
| Comparative Example 7 | 35.2 | 201 |
| Comparative Example 8 | 20.4 | 57 |
| Example 4 | 47.7 | 404 |
| Example 5 | 54.2 | 756 |
| Example 6 | 44.4 | 499 |
| Example 7 | 46.4 | 569 |
| Example 8 | 42.6 | 391 |
| Example 9 | 44.2 | 411 |
| Example 10 | 55.8 | 712 |
| Example 11 | 56.3 | 788 |
| Example 12 | 52.6 | 742 |
| Comparative Example 9 | 33.8 | 157 |
| Comparative Example 10 | 35.8 | 112 |
| Comparative Example 11 | 36.1 | 133 |
| Comparative Example 12 | 32.6 | 182 |
| Comparative Example 13 | 29.6 | 119 |

INDUSTRIAL APPLICABILITY

From a comparison of the above results of the series of examples and comparative examples, it is obvious that the zinc sulfide based phosphors obtained by the production methods of the present invention not only have high fluorescence quantum efficiency but also exhibit high EL brightness after they are processed into an EL device. Accordingly, the present invention is industrially useful in that it can provide a more practical phosphor material suitable for use in the production of a high-brightness EL device in an industrially advantageous manner.

The invention claimed is:

1. A method for producing a zinc sulfide based phosphor, comprising:
    firing a mixture comprising a zinc sulfide based phosphor precursor, sulfur, and a chlorine-containing flux to obtain a fired product; and
    firing the fired product,
    wherein the firing of the mixture comprises: heating the mixture in an atmosphere into which oxygen is introduced such that a temperature of the mixture is increased from normal temperature to a first temperature in a range of 800° C. to 850° C., inclusive, at which a transformation of a crystal system of the phosphor precursor is initiated; when a temperature of the mixture is increased above the first temperature, switching the atmosphere to a nitrogen atmosphere and continuing the heating of the mixture; and when the temperature of the mixture reaches a temperature in a range of 1000° C. to 1200° C., inclusive, maintaining the temperature of the mixture at a constant level and thereafter rapidly quenching the mixture and washing the mixture to obtain a fired product; and
    wherein the firing of the fired product comprises: heating the fired product in the nitrogen atmosphere such that a temperature of the fired product is increased from normal temperature to a temperature in a range of 650° C. to 1000° C., inclusive; and when a temperature of the fired product reaches the temperature in the range of 650° C. to 1000° C., inclusive, introducing oxygen while maintaining the temperature of the fired product and thereafter rapidly quenching the fired product and washing the fired product to obtain a zinc sulfide based phosphor.

2. The method of claim 1, wherein distortion is created in a crystal of the fired product after the washing in the firing of the mixture and before the firing of the fired product.

3. The method of claim 1, wherein distortion is created during the washing.

4. The method of claim 1, wherein a compound comprising copper, zinc, and sulfur is added to the fired product before the firing of the fired product.

5. The method of claim 1, wherein the phosphor precursor is a zinc sulfide based phosphor precursor obtained by adding to an organic solvent an aqueous solution comprising a zinc compound, a sulfurizing agent, and one or more metal compounds comprising at least one metal element selected from the group consisting of copper, silver, gold, manganese, iridium, and rare-earth elements, and thereafter heating a resulting mixture to carry out azeotropic dehydration.

6. The method of claim 1, wherein the phosphor precursor is a zinc sulfide based phosphor precursor obtained as a reaction product obtained by adding a sulfurizing agent to an aqueous solution comprising a zinc compound and one or more metal compounds comprising at least one metal element selected from the group consisting of copper, silver, gold, manganese, iridium, and rare-earth elements, and allowing the sulfurizing agent to react with the aqueous solution.

7. The method of claim 5 or 6, wherein the sulfurizing agent is at least one of thioacetamide and hydrogen sulfide.

8. The method of claim 1, wherein the phosphor precursor is a mixture comprising zinc sulfide and one or more metal compounds comprising at least one metal element selected from the group consisting of copper, silver, gold, manganese, iridium, and rare-earth elements.

9. The method of claim 1, wherein introduction of oxygen is carried out by allowing an oxygen-containing gas stream to flow into an atmosphere around the phosphor precursor.

10. The method of claim 9, wherein the oxygen-containing gas stream is an air stream.

* * * * *